United States Patent Office 2,992,217
Patented July 11, 1961

2,992,217
16α-HYDROXYMETHYL-PROGESTERONE AND DERIVATIVES
Jesus Romo Armeria, Mexico City, Mexico, assignor to Syntex S.A., Mexico City, Mexico, a corporation of Mexico
No Drawing. Filed May 12, 1959, Ser. No. 812,597
Claims priority, application Mexico May 15, 1958
17 Claims. (Cl. 260—239.55)

The present invention relates to novel cyclopentanophenanthrene derivatives and to a method for the preparation thereof.

More particularly, it relates to the novel 16α-hydroxymethyl-progesterone and also comprises the 16α-hydroxymethyl analog of its 21-hydroxy-analog, that is, of desoxycorticosterone, and the esters of these compounds.

Such new compounds possess valuable therapeutic properties: 16α-hydroxymethyl-progesterone shows anti-estrogenic, anti-androgenic and anti-progestational activity; 16α-hydroxymethyl-desoxycorticosterone neutralizes the undesirable electrolytic effect of desoxycorticosterone.

An oxygen function can be introduced at C–11 of such compounds by conventional means, and therefore these compounds are also important intermediates for the production of the corresponding 11-oxygenated compounds.

The novel final compounds of the present invention are illustrated by the following formulas:

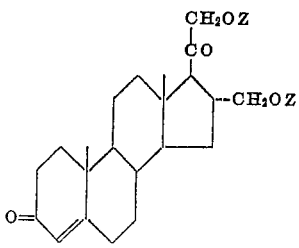

and

In the above formulas Z represents hydrogen or an acyl group derived from a hydrocarbon carboxylic acid of up to 12 carbon atoms, saturated or unsaturated, of straight or branched chain, cyclic or mixed cyclic-aliphatic, unsubstituted or conventionally substituted with, for example, methoxy or halogen. Typical acyl groups are acetate, propionate, butyrate, hemisuccinate, enanthate, caproate, benzoate, trimethylacetate, cyclopentylpropionate, acetoxypropionate, phenylpropionate and β-chloropropionate.

The novel process for preparing the above compounds comprises the conversion of a 16α-cyano-Δ⁵-pregnene (I) or of a 16α-cyano-Δ⁴-pregnene (II) into the respective 16α-carbomethoxy-Δ⁴-pregnene (IV: R=Me), as well as the transformation of the latter, via its 3,20-diketal (V), into the desired 16-hydroxymethyl compound (VI).

The following equation illustrates the process of my invention:

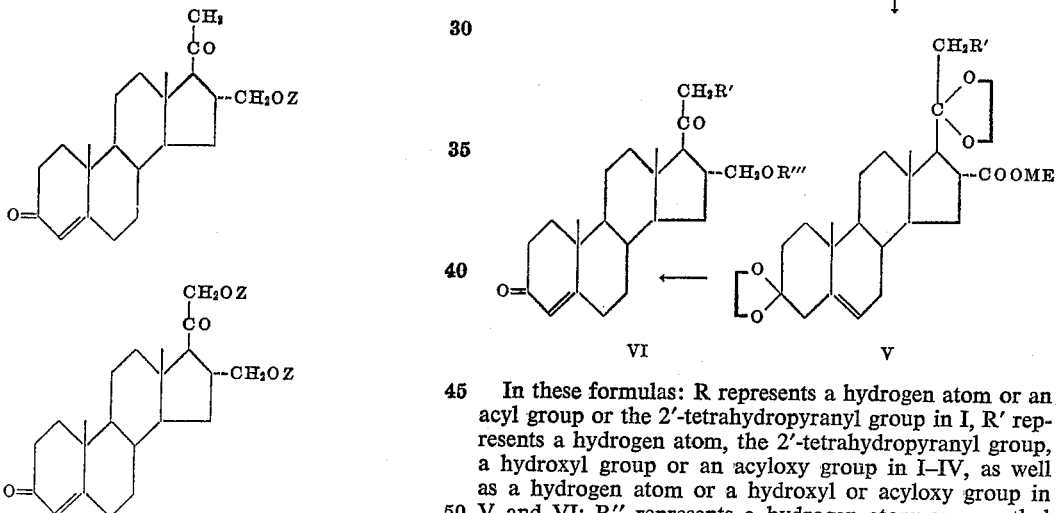

In these formulas: R represents a hydrogen atom or an acyl group or the 2'-tetrahydropyranyl group in I, R' represents a hydrogen atom, the 2'-tetrahydropyranyl group, a hydroxyl group or an acyloxy group in I–IV, as well as a hydrogen atom or a hydroxyl or acyloxy group in V and VI; R" represents a hydrogen atom or a methyl group; R''' represents a hydrogen atom or an acyl group.

Of the starting compounds, the following are unknown so far: the 3,21-bis-(2'-tetrahydropyranyl)-ether of 16α-cyano-Δ⁵-pregnene-3β,21-diol-20-one (I; R=2'-tetrahydropyranyl; R'=2'-tetrahydropyranoxy) and the 21-(2'-tetrahydropyranyl)-ether of 16α-cyano-desoxycorticosterone (II; R'=2'-tetrahydropyranoxy). In the "preparations" I describe the synthesis of these compounds.

The starting compounds were subjected to an alkaline treatment, preferably I refluxed them with a solution of potassium hydroxide in aqueous ethanol; this reaction causes the simultaneous hydrolysis of the ester group which might be present at C–3; the products resulting from this reaction, starting from the tetrahydropyranyl-ethers of I and II, were subjected to an acid treatment in order to hydrolyze the ether groupings, for example by reaction of an acetone solution of the steroid with hydrochloric acid. Thus, by the alkaline treatment of the corresponding 16α-cyano compounds I obtained 16a-carboxy-Δ$^5$-pregnen-3β-ol-20-one (III; R'=R''=H), 16α-carboxy-Δ$^5$-pregnen-3β,21 - diol - 20 - one (III; R'=OH; R''=H), 16α-carboxy-progesterone (IV; R'=R''=H) and 16α-carboxy-desoxycorticosterone (IV; R'=OH; R''=H), respectively.

16α-carboxy-Δ$^5$-pregnen-3β-ol-20-one was converted into 16α-carbomethoxy-Δ$^5$-pregnen-3β-ol - 20 - one (III; R'=H; R''=Me) for example by reaction with diazomethane, and then subjected the compound to an Oppenauer oxidation, to produce 16α-carbomethoxy-progesterone (IV; R'=H; R''=Me). The same compound was obtained by treatment of 16α-carboxy-progesterone with diazomethane.

16α-carboxy-Δ$^5$-pregnen-3β,21-diol-20-one was selectively esterified at C-21, preferably it was acetylated at this position by reaction with approximately 1 molar equivalent of acetic anhydride in pyridine solution at temperatures around 0° C.; the resulting 16α-carboxy-Δ$^5$-pregnen-3β,21-diol-20-one 21-acetate (III, R'=acetoxy; R''=H) was treated with diazomethane to produce 16α-carbomethoxy-Δ$^5$-pregnen-3β,21-diol-20 - one 21 - acetate (III, R'=acetoxy; R''=Me) which was then oxidized by the method of Oppenauer to form 16α-carbo carbomethoxy-desoxycorticosterone 21-acetate (IV; R'=acetoxy; R''=Me). The acetoxy group at C-21 of the latter compound was hydrolyzed without attacking the carbomethoxy group, for example by reaction with methanolic sodium methoxide at low temperature, and thus I produced 16α - carbomethoxy - desoxycorticosterone (IV; R'=OH; R''=Me). The same compound was also obtained by treatment of 16α-carboxy-desoxycorticosterone with diazomethane.

The keto groups at C-3 and C-20 of the compounds of Formula IV (R'=H or OH; R''=Me) were then protected by formation of the bis-cycloalkyleneketal, preferably there was formed the 3,20-bis-cycloethyleneketal by refluxing with ethyleneglycol in mixture with benzene and in the presence of p-toluenesulfonic acid, under anhydrous conditions; thus I obtained 3,20-bis-ethylenedioxy-16α-carbomethoxy-Δ$^5$-pregnene (V; R''=H) or 3,20 - bis - ethylenedioxy - 16α - carbomethoxy - Δ$^5$-pregnen-21-ol (V; R''=OH), respectively; the hydroxyl group at C-21 of the latter compound was acetylated by conventional methods to produce 3,20-bis-ethylenedioxy-16α - carbomethoxy - Δ$^5$ - pregnen - 21 - ol 21-acetate (V; R'=acetoxy).

Alternatively, 16α-carboxy-progesterone can first be ketalized and the resulting 3,20-bis-ethylenedioxy-16α-carboxy-Δ$^5$-pregnene is then treated with diazomethane to produce 3,20-bis-ethylenedioxy-16α-carbomethoxy-Δ$^5$-pregnene; 16α-carboxy-desoxycorticosterone can also be ketalized to form 3,20-bis-ethylenedioxy-16α-carboxy-Δ$^5$-pregnen-21-ol, which upon acetylation at C-21 followed by treatment with diazomethane gives rise to the formation of 3,20-bis-ethylenedioxy-16α-carbomethoxy-Δ$^5$-pregnen-21-ol 21-acetate (V; R'=acetoxy).

By treatment of V (R'=H, OH or acetoxy) with a double hydride, preferably under reflux with lithium aluminum hydride in mixture with ether and tetrahydrofurane, I reduced the carbomethoxy group to the hydroxymethyl group, which reaction also causes the simultaneous hydrolysis of the esterified group which may be present at C-21; upon subsequent hydrolysis of the ketal groups, for example by refluxing with hydrochloric acid in aqueous methanolic solution, I obtained 16α-hydroxymethyl-progesterone (VI; R'=R''=H) or 16α-hydroxymethyl-desoxycorticosterone (VI; R'=HO; R'''=H), respectively.

There were prepared a great variety of esters of the above compounds, namely 16α-acyloxymethyl-progesterones (VI; R'=H; R'''=acyl) and 16α-acyloxymethyl-21-acyloxy - Δ$^4$ - pregnen - 3,20 - diones (R'=acyloxy; R'''=acyl). Such esterification was effected by conventional methods, for example by reaction with the anhydride of a carboxylic acid in pyridine solution. The anhydride was derived from a carboxylic acid of up to 12 carbon atoms, saturated or unsaturated, of straight, branched, cyclic or mixed cyclic-aliphatic chain, substituted or not with methoxy, halogen or other groups. Among others, the ester groups may be such as the acetate, propionate, butyrate, hemisuccinate, enanthate, benzoate, trimethylacetate, phenoxyacetate, cyclopentylpropionate, phenylpropionate and β-chloropropionate.

Certain of the starting materials were prepared in accordance with the following preparations.

PREPARATION 1

A mixture of 5.2 g. of Δ$^{5,16}$-pregnadien-3β,21-diol-20-one 3,21-diacetate, 8 g. of sodium cyanide and 200 cc. of methanol was refluxed for 3 hours, cooled, diluted with water and extracted with ether; the extract was washed with water, dried over anhydrous sodium sulfate and evaporated to dryness. Crystallization of the residue from acetone-hexane afforded 16α-cyano-Δ$^5$-pregnen-3β,21-diol-20-one.

A solution of 3 g. of the above compound in 60 cc. of benzene was treated with 6 cc. of 2,3-dihydropyrane and a few cc. of the mixture was distilled in order to remove traces of moisture. There was then added 120 mg. of p-toluenesulfonic acid monohydrate and the mixture was kept at room temperature for 20 hours and poured into saturated aqueous sodium bicarbonate solution; the organic phase was separated, washed with water and the benzene was removed, thus yielding the 3,21-di-(2'-tetrahydropyranyl)-ether of 16α-cyano-Δ$^5$-pregnen-3β,21-diol-20-one.

PREPARATION 2

In another experiment a mixture of 2 g. of the free Δ$^{5,16}$-pregnadien-3β,21-diol-20-one, 2 g. of potassium cyanide, 30 cc. of methanol, 4 cc. of ethyl acetate and 4 cc. of water was refluxed for 2 hours, thus giving finally 16α-cyano-Δ$^5$-pregnen-3β,21-diol-20-one, identical with the compound prepared in accordance with the previous method.

PREPARATION 3

A solution of 10 g. of 16α-cyano-Δ$^5$-pregnen-3β,21-diol-20-one, obtained in accordance with Preparation 1, in 50 cc. of pyridine was cooled to 0° C., treated with 1 molar equivalent of acetic anhydride and kept overnight at 0° C. The mixture was diluted with water and the product was extracted with ethyl acetate, washed with dilute hydrochloric acid, aqueous sodium bicarbonate solution and finally with water to neutral, dried over anhydrous sodium sulfate and evaporated to dryness. Crystallization of the residue from acetone-hexane afforded 16α-cyano-Δ$^5$-pregnen-3β,21-diol-20-one 21-acetate.

A mixture of 10 g. of 16α-cyano-Δ$^5$-pregnen-3β,21-diol-20-one 21-acetate, 400 cc. of dry toluene and 80 cc. of cyclohexanone was dried by distillation of approximately 50 cc. and then there was added a solution of 22 g. of aluminum isopropylate in 80 cc. of anhydrous toluene. The mixture was refluxed for 3 hours, diluted with 750 cc. of an aqueous solution of sodium potassium tartrate and then subjected to a steam distillation and cooled; the solid residue was collected by filtration, washed with water, dried and recrystallized from aqueous methanol, thus producing 16α-cyano-desoxycorticosterone 21-acetate.

The acetoxy group of the latter compound was hydrolyzed by treatment with 200 cc. of 1% methanolic potassium hydroxide at 0° C. for 1 hour. The free 16α-cyanodesoxycorticosterone was precipitated by the addition of water and then filtered and recrystallized from acetonehexane. There was then formed its 21-(2'-tetrahydropyranyl)-ether by the method described in Preparation 1.

The following specific examples serve to illustrate but are not intended to limit the present invention.

*Example I*

A mixture of 77 g. of 16α-cyano-Δ⁵-pregnen-3β-ol-20-one (M.P. 228–232° C.), 500 cc. of ethanol and a solution of 30 g. of potassium hydroxide in 100 cc. of water was refluxed for 1 hour, cooled, diluted with water, acidified with 20% hydrochloric acid and the precipitate was collected by filtration, washed with water, dried and recrystallized from acetone-ether. There was thus obtained 16α-carboxy-Δ⁵-pregnen-3β-ol-20-one; M.P. 223–235° C.; $[\alpha]_D$ —115° (chloroform).

To a solution of 5 g. of the above acid in 120 cc. of methanol there was added dropwise 120 cc. of an ether solution of diazomethane prepared from 12 g. of N-nitrosomethylurea; the mixture was kept at room temperature overnight, then acetic acid was added in order to destroy the excess of diazomethane and the ether solution was washed with water, dried over anhydrous sodium sulfate and concentrated. Upon cooling, there was obtained 16α-carbomethoxy-Δ⁵-pregnen-3β-ol-20 - one; M.P. 206–207° C.; $[\alpha]_D$-116° (chloroform).

The above methyl ester was subjected to an Oppenauer oxidation in the following manner: 5 g. of 16α-carbomethoxy-Δ-⁵-pregnen-3β-ol-20-one was dissolved in a mixture of 160 cc. of anhydrous toluene and 50 cc. of cyclohexanone and 15 cc. of solvent was distilled in order to remove traces of moisture by azeotropic distillation. There was then added a solution of 8 g. of aluminum isopropylate in 30 cc. of anhydrous toluene and the mixture was refluxed for 3 hours. The volatile solvents were removed by steam distillation and the product was extracted with ether, dried over anhydrous sodium sulfate and evaporated to dryness. The residue crystallized from acetone-methanol to furnish 16α-carbomethoxy-progesterone; M.P. 157–158° C.; $[\alpha]_D$+31° (chloroform); λ max. 240mμ, log E 4.23.

A mixture of 3 g. of the above compound, 600 cc. of anhydrous benzene, 40 cc. of ethyleneglycol and 400 mg. of p-toluenesulfonic acid was refluxed for 20 hours with the aid of an adapter for the continuous removal of the water formed during the reaction. Aqueous sodium bicarbonate solution was added to the cooled mixture and the benzene layer was separated, washed with water, dried over anhydrous sodium sulfate and evaporated to dryness. Crystallization of the residue from methanol furnished 16α - carbomethoxy-3, 20 - bis-ethylenedioxy-Δ⁵-pregnene, which was purified by recrystallization from acetone-methanol; M.P. 182–183° C.; $[\alpha]_D$-70° (chloroform).

A solution of 2 g. of the above bis-ketal in 25 cc. of anhydrous tetrahydrofurane was slowly added to a suspension of 500 mg. of lithium aluminum hydride in 80 cc. of anhydrous ether and the mixture was refluxed for half an hour. Water was added to decompose the excess of hydride, the mixture was acidified with dilute hydrochloric acid and the organic layer was separated and washed with water, dried over anhydrous sodium sulfate and the solvent was evaporated. The residue was dissolved in 20 cc. of methanol containing a few drops of concentrated hydrochloric acid and the solution was refluxed for 15 minutes, diluted with water, cooled and extracted with ether. The extract was washed with water, dried over anhydrous sodium sulfate and evaporated to dryness. Sevearl recrystallizations of the residue from acetone-hexane yielded 16α-hydroxymethyl-progesterone; M.P. 166–168° C.; $[\alpha]_D$+77° (chloroform); λ max. 240–242 mμ, log E 4.23.

A mixture of 1 g. of the above compound, 10 cc. of pyridine and 1 cc. of acetic anhydride was kept overnight at room temperature, poured into water and extracted with chloroform; the extract was washed with dilute hydrochloric acid, 5% sodium carbonate solution and water, dried over anhydrous sodium sulfate and evaporated to dryness. Crystallization of the residue from acetone-hexane furnished 16α-hydroxymethyl-progesterone acetate. By the same conventional esterification using the corresponding acid anhydride in place of acetic anhydride there was prepared, the propionate, cyclopentylpropionate and benzoate of 16α-hydroxymethyl-progesterone.

*Example II*

By substituting in the method of Example I 16α-cyano-Δ⁵-pregnen-3β-ol-20-one for its acetate, there was obtained in the reaction with potassium hydroxide, with simultaneous hydrolysis of the acetoxy group, 16α-carboxy-Δ⁵-pregnen-3β-ol-20-one, identical with the compound obtained in such example.

*Example III*

By substituting in the last step of the method described in Example I the acetic anhydride for 1.5 cc. of propionic anhydride, there was obtained 16α-hydroxymethyl-progesterone propionate. By the same method, but using the anhydride or chloride of other carboxylic acids of up to 12 carbon atoms, there were obtained the corresponding esters of 16α-hydroxymethyl-progesterone.

*Example IV*

By substituting in the method of Example I for the 16α-cyano-Δ⁵-pregnen-3β-ol-20-one, the 3,21 - bis-(2'-tetrahydropyranyl) - ether of 16α-cyano-Δ⁵-pregnen-3β,21-diol-20-one, there was obtained in the step of the reaction with potassium hydroxide the 3,21-bis-(2'-tetrahydropyranyl)-ether of 16α-carboxy-Δ⁵-pregnen-3β,21-diol-20-one. The latter was dissolved in acetone, treated with 3 cc. of hydrochloric acid, kept overnight at room temperature, poured into water and extracted with ethyl acetate; the extract was washed with water, dried over anhydrous sodium sulfate and evaporated to dryness, thus yielding 16α-carboxy-Δ⁵-pregnen-3β,21-diol-20 - one. The latter was selectively esterified at C-21, preferably it was acetylated at this position by treatment with 1 molar equivalent of acetic anhydride in pyridine solution at low temperature and the carboxyl group was then esterified by reaction with diazomethane. The product was then subjected to the Oppenauer oxidation of Example I, thus producing finally 16α-carbomethoxy - Δ⁴-pregnen-21-ol-3,20-dione 21-acetate, namely 16α-carbomethoxy-desoxycorticosterone acetate.

A mixture of 5 g. of the above compound and a solution of sodium methoxide prepared by dissolving 300 mg. of sodium in 50 cc. of absolute methanol was stirred for 1 hour under an atmosphere of nitrogen, poured into 300 cc. of aqueous saturated sodium chloride solution containing 2 cc. of acetic acid and the precipitate was collected, washed and recrystallized from acetone-hexane, thus giving the free 16α-carbomethoxy-desoxycorticosterone.

5 g. of the above 16α-carbomethoxy-desoxycorticosterone was treated with ethyleneglycol under the ketalization conditions described in Example I, to give 16α-carbomethoxy-3,20-bis-ethylenedioxy-Δ⁵-pregnen-21-ol; 5 g. of the latter mixed with 20 cc. of pyridine was acetylated by reaction with 5 cc. of acetic anhydride, overnight at room temperature, to form 16α-carbomethoxy-3,20-bis-ethylenedioxy-Δ⁵-pregnen-21-ol 21-acetate.

2 g. of the above compound was treated with lithium aluminum hydride and the ketal groups were then hydrolyzed, as described for this reaction in Example I, to produce, with simultaneous hydrolysis of the 21-acetate group, 16α-hydroxymethyl-desoxycorticosterone.

The hydroxyl groups of the latter were then esterified, for example by treatment of a mixture of 1 g. of 16α-hydroxymethyl-desoxycorticosterone and 20 cc. of pyridine with 2 cc. of propionic anhydride, overnight at room temperature. There was thus obtained 16α-propionoxymethyl-desoxycorticosterone 21-propionate. By the same conventional esterification using the corresponding acid anhydride in place of propionic anhydride there was prepared the diacetate, dicyclopentylpropionate and dibenzoate.

In another experiment 16α-carbomethoxy-3,20-bis-ethylene-dioxy-Δ5-pregnen-21-ol was treated with lithium aluminum hydride to produce, after hydrolysis of the ketal groups, 16α-hydroxymethyl-desoxycorticosterone.

*Example V*

The treatment of 16α-cyano-progesterone with potassium hydroxide in mixture with aqueous ethanol under reflux, as described for this reaction in Example I, produced 16α-carboxy-progesterone, which was then transformed into its methyl ester by reaction with diazomethane.

*Example VI*

By substituting in the method of Example V for the 16α-cyano-progesterone the 21-(2′-tetrahydropyranyl)-ether of 16α-cyano-desoxycorticosterone there was obtained 16α-carboxy-desoxycorticosterone upon refluxing with potassium hydroxide in aqueous ethanol solution followed by hydrolysis of the ether group. By applying the methods described in Example I, there were protected the keto groups of the latter by ketalization, the hydroxyl group at C-21 was acetylated and the carboxy group was converted into the carbomethoxy group; there was thus obtained as an intermediate 16α-carbomethoxy-3,20-bis-ethylenedioxy-Δ5-pregnen-21-ol 21-acetate, identical with the one obtained in Example V.

I claim:
1. A compound of the following formula:

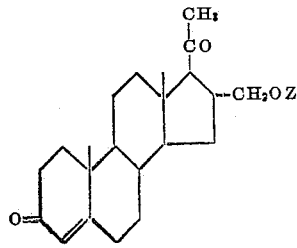

wherein Z is selected from the group consisting of hydrogen and a hydrocarbon carboxylic acyl group of up to 12 carbon atoms.
2. 16α-hydroxymethyl-progesterone.
3. The hydrocarbon carboxylic esters of up to 12 carbon atoms of 16α-hydroxymethyl-progesterone.
4. 16α-hydroxymethyl-desoxycorticosterone.
5. The 16,21-di hydrocarbon carboxylic esters of up to 12 carbon atoms of 16α-hydroxymethyl-desoxycorticosterone.
6. 16α-cyano-Δ5-pregnen-3β,21-diol-20-one.
7. The 3,21-bis-(2′-tetrahydropyranyl)-ether of 16α-cyano-Δ5-pregnen-3β,21-diol-20-one.
8. 16α-cyano-Δ5-pregnen-3β,21-diol-20-one 21-acetate.
9. 16α-cyano-desoxycorticosterone.
10. 16α-cyano-desoxycorticosterone acetate.
11. 16α-carboxy-Δ5-pregnen-3β-ol-20-one.
12. The methyl ester of 16α-carboxy-Δ5-pregnen-3β-ol-20-one.
13. 16α-carbomethoxy-progesterone.
14. 16α-carbomethoxy-desoxycorticosterone.
15. 16α-carbomethoxy-desoxycorticosterone acetate.
16. 16α-carboxy-progesterone.
17. 16α-carboxy-desoxycorticosterone.

References Cited in the file of this patent
UNITED STATES PATENTS 2,817,671    Mazur    Dec. 24, 1957
2,879,279    Van der Burg    Mar. 24, 1959

OTHER REFERENCES

Ellis et al.: J. Chem. Soc., London, October 1958, pages 3748–9.